J. L. WHITNEY.
TRAP.
APPLICATION FILED SEPT. 8, 1909.

986,254.

Patented Mar. 7, 1911.

Witnesses
Chas. C. Richardson
J. W. Garner

Inventor
John L. Whitney,
By Victor J. Evans
Attorney

THE NORRIS PETERS CO., WASHINGTON, D. C.

UNITED STATES PATENT OFFICE.

JOHN L. WHITNEY, OF MARION, INDIANA.

TRAP.

986,254.  Specification of Letters Patent.  Patented Mar. 7, 1911.

Application filed September 8, 1909. Serial No. 516,794.

*To all whom it may concern:*

Be it known that I, JOHN L. WHITNEY, a citizen of the United States, residing at Marion, in the county of Grant and State of Indiana, have invented new and useful Improvements in Traps, of which the following is a specification.

This invention is an improved trap especially adapted for use for destroying, by impaling, rats and other noxious animals, the object of the invention being to provide an improved trap which is extremely cheap, and simple, is very strong and durable, is not likely to get out of order and which may be set simply by the act of drawing up the impaling plunger, the said invention consisting in the construction, combination and arrangement of devices hereinafter described and claimed.

Figure 1:
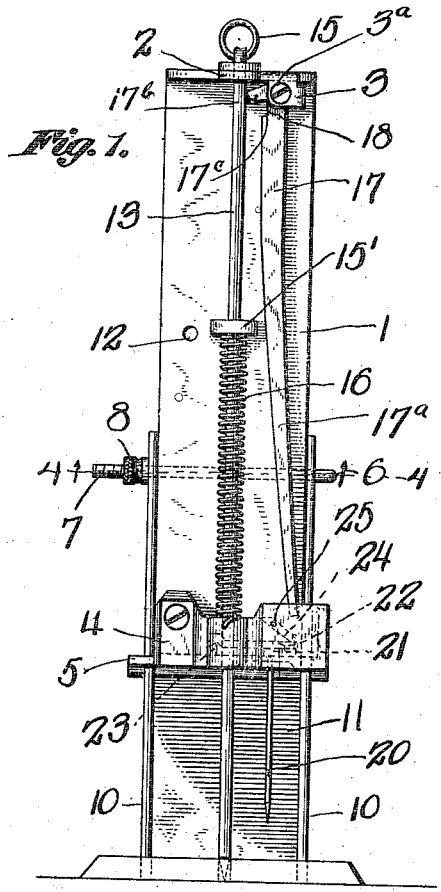
Figure 2:
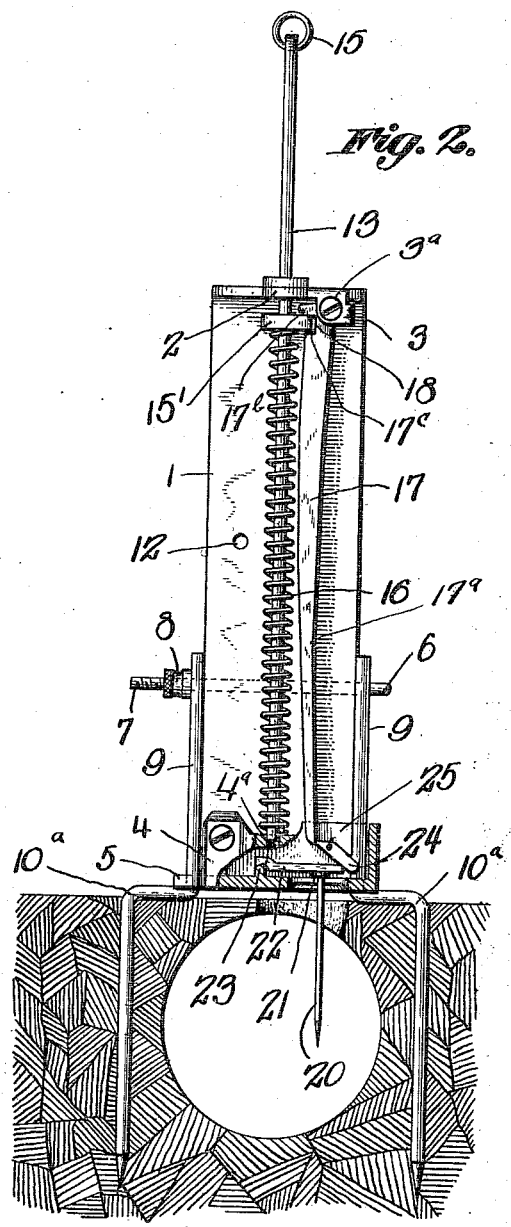
Figure 3:
Figure 4:
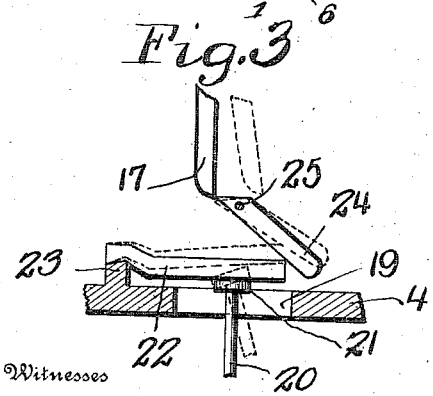

In the accompanying drawings:—Figure 1 is an elevation of a trap constructed in accordance with my invention showing the same sprung and arranged for use in connection with a bait box. Fig. 2 is a similar view of my improved trap showing the same in initial set position and used in connection with a pair of securing pins embedded in the earth and over the runway of a burrowing animal, the trigger of the trap being shown in position in the burrow or runway. Fig. 3 is a detail view showing a portion of the base in section, showing the catch, the dog, the trip bar and the trigger in full lines in initial set position and in dotted lines in tripped position. Fig. 4 is a sectional view taken upon the line 4—4 of Fig. 1.

In the form of the invention shown, a plate 1 is provided, which may be made of any suitable material and is provided at its upper end with a flange 2 which extends outwardly therefrom and which flange is provided with a downturned lug 3. The flange 2 is provided with a suitable guide opening for an impaling plunger 13 which is here shown as a rod, the lower end of which is pointed and which rod or plunger is provided with a ring 15 forming a handle at its upper end. On the front side of the plate 1 at the lower end thereof is secured a box or casing 4. The said box or casing has a guide opening indicated at 4ª for the plunger and the bottom of the said box or casing is provided with a slot 19 and has on its upper side a stud or rib 23 the upper edge of which is inclined or beveled as shown. The plate 1 has an opening 12 through which a nail, screw or other suitable device may be passed to secure the trap against a wall or washboard, if desired. On the lower portion of the plunger is a coiled retractile spring 16, the lower end of which is suitably secured to the neck or central portion of the box or casing 4. At a suitable distance from its upper end, the said plunger is provided with a cross head 15′ which is secured thereto for movement therewith and the upper end of the said spring 16 is secured to the said cross head.

A catch to lock the plunger in elevated position is shown at 17, which catch is substantially of inverted L-shape comprising the upright arm 17ª and a substantially horizontal arm 17ᵇ at its upper end, which arm 17ᵇ is relatively short. At a suitable distance below the said arm 17ᵇ is a shoulder 17ᶜ, a recess or notch 18 being formed between the said arm 17ᵇ and said shoulder 17ᶜ and adapted for the reception of one end of the cross head 15′ which forms the stop element of the plunger. The upright arm 17ª of the catch 17 narrows downwardly as shown. Said catch is pivoted at its upper end to the lug 3 as by means of a pivot screw 3ª, said pivot screw being disposed in the angle between the arms 17ª and 17ᵇ of the catch. A dog 24 is located in the box or casing 4 near one end of the latter and is pivotally mounted, its pivot 25 being near the upper end of the said dog so that the latter is adapted by gravity to drop behind the lower end of the long arm of the catch 17 and lock the catch in engaged position with the stop element 15′ of the plunger as shown in Figs. 2 and 3. In the lower portion of the box or casing is a trip bar 22 which is here shown as disposed above the slot 19 and having one end bent upwardly and then outwardly and bearing on the rib 23 so that the said trip bar is mounted for angular movement in a vertical plane. The length of the trip bar is such that its free end bears against the lower portion of the dog 24. The trigger 20 is provided with a head 21. The stem of the said trigger is disposed in the slot 19 and may be adjusted therein as may be desired, the head of the trigger bearing on the bottom of the box or casing 4 and under the trip bar 22 and when the trap is set serving to hold the trip bar in engagement with the dog 24.

To set the trap it is only necessary to draw the plunger upwardly by means of its handle ring 15. The upward movement of the plunger is against the tension of the spring 16 and serves to extend the said spring. As the cross head or stop 15' of the plunger nears the upper end of the catch, it engages the under side of the short arm 17$^b$, which forms the set shoulder of the catch, said stop element of the plunger and the set shoulder of the catch coacting to move the catch angularly toward the plunger, and said catch also by its own gravity moves toward the plunger, the end of the stop element 15' of the plunger being received in the notch 18 of the catch and the stop shoulder 17$^c$ of the catch engaging the under side of said stop element 15' of the plunger as shown in Fig. 2. The movement of the lower end of the catch 17 toward the plunger causes said catch to swing over the upper end of the dog 24 and the latter by its own gravity drops behind the lower end of the catch as shown in Fig. 2 and also in full lines in Fig. 3. This movement of the dog causes the latter to bear on the trip bar 22 and the trip bar by bearing on the head of the trigger 20 holds the latter in vertical position. When the trigger is moved by the animal, it is somewhat inclined thereby causing its head 21 to turn angularly, such motion of the head causing the front end of the trip bar to raise and said trip bar raising the lower end of the dog and lowering the upper end of the dog so that the dog releases the catch whereupon the tension of the spring 16 on the plunger draws the latter downwardly with force, the initial downward movement of the plunger, by the action of its stop element 15' on the stop shoulder 17$^c$ of the catch, moving the latter out of engagement with said stop element 15' as will be understood.

In Fig. 1 of the drawings I show the trap mounted on and used in connection with a bait box 11, which forms a support for the base of the trap. The bait box has a pair of upwardly extending arms 10 which extend through the bottom of the casing 4 and are supported upon a suitable base. The base may be provided with a wall or closure as shown in Fig. 1 of the drawing. The rods 10 are effectively connected with the plate 1 through the medium of a bail 6, said bail having one of its ends screw threaded as at 7 and being provided with a clamping nut 8 for adjustably securing the plate and casing 4 to the arms 10.

In Fig. 2 of the drawings I have shown the arms 10$^a$ provided with offset depending portions which are adapted to be inserted within the ground adjacent the walls of a burrow or runway. The vertical upwardly extending portion of the arms, designated by the numeral 9 are connected with the plate 1 through the medium of a bail 6, which is also provided with a threaded extremity 7 and adapted for engagement with a nut 8.

What is claimed is:—

An animal trap comprising a rectangular plate having its upper edge provided with a flange and its lower edge provided with a housing, sustaining members adjustably connected with the sides of the plate, a plunger rod upon one face of the plate and the lower end thereof normally positioned within the housing and projecting through the flange of the plate, said plunger having said lower end sharpened, a cross head upon the plunger, a retractile spring connecting the cross head and the housing, a catch member pivotally connected with the plate, said catch member extending approximately the entire distance of the plate and having its inner face diverging from its bottom to its upper portion, a dog pivotally connected with the plate, a trap bar within the housing and having one of its ends normally underlying the dog, the bottom wall of the housing being provided with an elongated slot, and a trigger member provided with an enlarged head and a depending body portion adjustably positioned within the slot and to have its head lie beneath the trap bar, substantially as and for the purpose set forth.

In testimony whereof I affix my signature in presence of two witnesses.

JOHN L. WHITNEY.

Witnesses:
GRANT A. DENTLER,
MARSHALL WILLIAMS.

---

Copies of this patent may be obtained for five cents each, by addressing the "Commissioner of Patents, Washington, D. C."